(12) United States Patent
Mueller et al.

(10) Patent No.: US 7,870,727 B2
(45) Date of Patent: Jan. 18, 2011

(54) METHOD OF CONTROLLING A HYDROSTATIC DRIVE

(75) Inventors: Matthias Mueller, Neusaess (DE); Peter Schmuttermair, Gessertshausen (DE)

(73) Assignee: Bosch Rexroth AG, Stuttgart (DE)

( * ) Notice: Subject to any disclaimer, the term of this patent is extended or adjusted under 35 U.S.C. 154(b) by 385 days.

(21) Appl. No.: 12/065,677

(22) PCT Filed: Dec. 19, 2006

(86) PCT No.: PCT/EP2006/012261
§ 371 (c)(1),
(2), (4) Date: Mar. 4, 2008

(87) PCT Pub. No.: WO2007/101467
PCT Pub. Date: Sep. 13, 2007

(65) Prior Publication Data
US 2008/0250781 A1    Oct. 16, 2008

(30) Foreign Application Priority Data
Dec. 23, 2005 (DE) ............... 10 2005 061 991

(51) Int. Cl.
*F16H 39/00* (2006.01)
*B60K 17/10* (2006.01)
(52) U.S. Cl. ........................... 60/414; 60/491; 180/165

(58) Field of Classification Search .................. 60/414, 60/416, 417, 454, 488, 490, 491; 180/165
See application file for complete search history.

(56) References Cited

U.S. PATENT DOCUMENTS

| 4,679,396 | A | * | 7/1987 | Heggie | 60/414 |
| 4,813,510 | A | * | 3/1989 | Lexen | 60/414 |
| 6,971,463 | B2 | * | 12/2005 | Shore et al. | 180/165 |

FOREIGN PATENT DOCUMENTS

| AT | 395 960 B | 4/1993 |
| DE | 29 49 337 A1 | 6/1980 |
| EP | 1 433 648 A2 | 6/2004 |

* cited by examiner

*Primary Examiner*—Thomas E Lazo
(74) *Attorney, Agent, or Firm*—Scully, Scott, Murphy & Presser, P.C.

(57) ABSTRACT

A method of controlling a hydrostatic drive is provided. The hydrostatic drive has a hydraulic pump and a hydraulic engine. The hydrostatic drive further has a first and a second hydraulic reservoir for storing and recuperating energy. Pressure energy is stored in the first reservoir. For the purpose of recuperating the pressure energy stored in the first reservoir, the first reservoir is connected to a suction side of the hydraulic pump. A downstream working line of the hydraulic engine is connected to the second reservoir. In addition, the downstream working-line connection of the hydraulic engine is disconnected from the suction side of the hydraulic pump.

14 Claims, 4 Drawing Sheets

Fig. 4

METHOD OF CONTROLLING A HYDROSTATIC DRIVE

BACKGROUND

The invention relates to a method of controlling a hydrostatic drive, with the recuperation of stored energy.

Hydrostatic drives are often used for driving utility vehicles. In that connection, it is possible, via the hydrostatic drive, to store part of the kinetic energy during the braking operation, and to subsequently recover it. The use of a hydrostatic drive in a closed circuit with a hydraulic pump which is intended to effect delivery in only one direction is proposed in AT 395 960 B. The working line on the delivery side, which connects the hydraulic pump to the hydraulic engine, is connected to a high-pressure reservoir. A second reservoir is present, which is constructed as a low-pressure reservoir and is connected to the working line which is on the suction side with respect to the hydraulic pump. The high-pressure reservoir and also the low-pressure reservoir are permanently connected to the working line on the delivery side and to the working line on the suction side, respectively. During normal traction-type operation, the hydraulic pump effects delivery into the working line on the delivery side. The hydraulic engine is adjustable and is swung out in a first direction for travel purposes. If the vehicle moves into overrunning-type operation, the absorption volume of the hydraulic engine is first of all adjusted in the direction of zero. In order to achieve a braking action, the hydraulic engine is then swung out in the opposite direction. As a result of this, said hydraulic engine effects delivery into the working line which is on the delivery side with respect to the hydraulic pump.

A non-return valve is provided in the working line in order to prevent pressure medium from flowing into said hydraulic pump counter to the latter's direction of delivery. The pressure medium delivered by the hydraulic engine is accordingly delivered to the high-pressure reservoir. The kinetic energy of the vehicle is thereby converted into pressure energy, with an increase in the pressure within the high-pressure reservoir. Balancing of the volume flow takes place by the removal of pressure medium from the low-pressure reservoir.

If the stored energy is to be recovered, pressure medium is removed from the high-pressure reservoir. The hydraulic engine is now swung out in its first direction again, as in the previous traction-type operation. When the pressure medium is relieved of pressure via the hydraulic engine, the latter generates an output moment. The pressure medium which is being conveyed through the hydraulic engine is delivered to the low-pressure reservoir for volume-balancing purposes.

A disadvantage of the known drive is that, for the purpose of removing the pressure medium, the hydraulic engine is loaded with the pressure medium directly from the high-pressure reservoir. In the proposed drive with recuperation of the kinetic energy, it is also necessary to tilt the hydraulic engine beyond its neutral location. In the process, the direction of flow within the hydraulic circuit is partially reversed. Because the pressure medium is fed directly to the hydraulic engine, addition of the moments by utilising the pressure in the high-pressure reservoir and also the torque of an engine driving the hydraulic pump is not possible.

SUMMARY

It is an object of the invention to provide a method of controlling a hydrostatic drive, in which recuperation of the stored energy and the feeding-in of a driving moment by a driving engine are possible at the same time.

This object is achieved by means of the method according to the invention having the features in claim 1.

In the method according to the invention for controlling a hydrostatic drive, a hydraulic pump and a hydraulic engine, and also a first and a second hydraulic reservoir for storing and recuperating energy, are connected to one another in a closed circuit of a hydrostatic drive. According to the invention, pressure energy is stored in the first reservoir. For the purpose of recuperating this stored energy, the first reservoir is connected to a suction side of the hydraulic pump. In addition, the downstream connection of the hydraulic engine is connected to the second reservoir in order to achieve balancing of the volume flow. As a result of the connection of the first reservoir, in which kinetic energy is stored in the form of pressure energy, for example during a braking operation, said pressure energy can be made available to the drive again and thereby recovered. In the process, an increase in pressure is brought about, at the suction side of the hydraulic pump, by the pressurised pressure medium stored in the first reservoir. As a result of this increase in pressure at the suction side of the hydraulic pump, the required driving output of a primary driving engine which drives the hydraulic pump is diminished. The pressure difference, which would normally have to be generated by the driving engine alone, is reduced and the energy, which is to be primarily expended on the part of the driving engine, is thereby diminished. In addition, this procedure also offers the advantage that, not only is the pressure energy stored in the first reservoir available for driving the hydraulic engine, but a driving moment of the driving engine can additionally be fed to the hydraulic pump. An addition of moments takes place. At the hydraulic pump, a pressure which acts upon the hydraulic engine is made available on the delivery side.

Under these circumstances, it is possible, in particular, to make available an adequate pressure which is necessary for the travel situation, even when the reservoir is empty. In this case, the torque fed to the hydraulic pump is correspondingly increased by the driving engine. This addition of moments leads to control which is considerably more flexible and more appropriate to the situation, with the recuperation of pressure energy which is stored in the first reservoir.

Advantageous further developments of the method according to the invention are set out in the subclaims.

The downstream connection of the hydraulic engine is preferably first of all disconnected from the suction side of the pump, and only after a fixed first time interval is the first reservoir connected to said suction side of the hydraulic pump. Said fixed first time interval is preferably determined in accordance with the dynamic behaviour of the valves. The time sequence in the actuation of the valves for connecting and disconnecting the lines within the hydrostatic drive ensures that the connection of the first reservoir to the suction side of the hydraulic pump does not lead to a pressure surge at the downstream connection of the hydraulic engine.

It is also advantageous, during the recuperation of the pressure energy, to load the hydraulic pump with a driving torque. The guaranteeing of a driving torque of this kind, which is generated by the driving engine, which is generally designed as a diesel internal combustion engine, ensures that the said diesel internal combustion engine does not pass over into thrust-type operation. In the event of thrust-type operation of this kind, energy would be wasted unnecessarily. Thrust-type operation leads to the fact that the pressure energy which is present works against the supporting element of the diesel engine and is converted into heat at that point. A driving torque which is different from zero is therefore preferably always generated by the driving engine during the recuperation of the pressure energy.

For the purpose of fixing the absorption volume of the hydraulic engine during the recuperation of energy, a pre-control value for a hydraulic-engine moment is first of all ascertained, and the absorption volume of the hydraulic engine is ascertained and set on the basis of this estimated pre-control value. In doing so, the pre-control value is preferably corrected, taking into account measured actual quantities in the process. It is thereby possible, first of all, to ascertain a pre-control value which is ascertained on an approximate basis from an operator's specification. Thus, an intended change in speed is ascertained from a driving-throttle specification. A moment which is required for achieving this change in speed and which is to be generated by the hydrostatic drive is thereupon ascertained. From this moment, it is then possible to ascertain that angle of swing or absorption volume on the part of the hydraulic engine which is necessary for generating the moment.

This absorption volume forms the pre-control value, a more precise adaptation of that absorption volume of the hydraulic engine which is to be set being corrected by taking into account actual quantities measured in the drive. A regulating system is superimposed on the pre-control value.

In order to ascertain said pre-control value, a difference is ascertained from a target vehicle speed and an actual vehicle speed, if the hydrostatic drive in question is a traction-type drive.

At the end of an operation for recuperating stored energy from the first reservoir, said first reservoir is first of all cut off from the suction side of the hydraulic pump and the downstream connection of the hydraulic engine is connected to said suction side of the hydraulic pump after a fixed second time interval. Only after that is the downstream connection of the hydraulic engine cut off from the second reservoir. This special sequence when changing from regenerative traction-type operation with the recuperation of energy and normal hydrostatic traction-type operation ensures that an interruption of tractive power is avoided. For this purpose, in particular, the first reservoir is first of all cut off from the suction side of the hydraulic pump and the downstream connection of the hydraulic engine is then connected to said suction side. This prevents a pressure rise at the downstream connection of the hydraulic engine. At this point in time, moreover, the second reservoir, which is constructed as a low-pressure reservoir, still remains connected to the downstream connection of the hydraulic engine. As a result of this, damping is achieved, so that the occurrence of oscillations when switching over to normal hydrostatic operation is avoided. The second time interval is also essentially determined by the valve dynamics.

When there is a transition to so-called "reservoir braking", that is to say, to a braking operation in which pressure energy is stored in the first reservoir by the hydraulic engine which is then acting as a pump, it is advantageous to detect the actuation of a braking apparatus and to thereupon initiate the storage of pressure energy. For this purpose, when a braking apparatus, for example a brake pedal of a utility vehicle is actuated, the hydrostatic transmission is first of all swung back, at a constant transmission ratio, to a lower absorption volume or a lower delivery volume. As a result of the reducing of the absorption volume or delivery volume in the same ratio, so that the transmission ratio set remains constant, a jerk-free transition between an accelerated traction-type operation and a braking operation is achieved.

According to another preferred form of embodiment of the method according to the invention, a delivery side of the hydraulic pump and also the second reservoir are connected to the upstream connection when the braking apparatus is actuated. At the same time, the suction side of the hydraulic pump and also the first reservoir are connected to the downstream connection of the hydraulic engine when said braking apparatus is actuated. What is achieved by this means, in addition to the hydrostatic braking by which the first reservoir is charged up, is that the closed hydraulic circuit is supplied, parallel thereto, with pressure medium via the hydraulic pump. This supplying of the closed hydrostatic circuit with pressure medium ensures that subsidiary units can likewise be loaded with a pressure which is necessary for them. Moreover, the supporting moment of the driving engine can additionally be used for retarding purposes. Under these circumstances, it is particularly advantageous to set to a delivery volume which is different from zero during the storage operation in the course of a braking operation.

In order to set the hydrostatic retarding operation in dependence upon an operator's desire for deceleration, the absorption volume of the hydraulic engine is set, during the storage of the energy in the course of a retarding operation, to a value which is dependent upon the braking signal from the braking apparatus and upon an effective pressure-difference value. The said effective pressure-difference value takes into account the pressure difference between the first reservoir and the second reservoir and also, preferably, a pressure drop through the line system of the hydrostatic drive.

The downstream connection of the hydraulic engine is preferably disconnected from the first reservoir, and the upstream connection of said hydraulic engine from the second reservoir, before the hydraulic engine, that is to say the output shaft of said hydraulic engine, reaches a standstill. By this means, a reduction in the braking moment is achieved, and gentle retardation to a standstill is possible. In addition, the delivery volume of the hydraulic pump is preferably adjusted to zero.

According to another preferred aspect of the method, the first reservoir is connected, for the purpose of starting an internal combustion engine connected to the hydraulic pump, to the suction side of said hydraulic pump. It is thereby possible, for example for the purpose of starting up the diesel internal combustion engine, to load the hydraulic pump connected to said diesel internal combustion engine with pressure medium from the first reservoir. The hydraulic pump then acts as a hydraulic engine and generates the necessary torque in order to start the driving engine.

Furthermore, it is preferred if the hydraulic pump is driven by a driving engine, if required, for the purpose of storing pressure energy in the first reservoir, and the delivery side of the hydraulic pump is connected to said first reservoir. By this means, it is possible not only to store pressure energy in the first reservoir during a braking operation, but pressure energy can also be stored in said first reservoir independently of a reservoir-braking operation. Thus, for example, the first reservoir can be fully charged up prior to the shutting-off of the diesel internal combustion engine, so that, in any case, sufficient pressure is available in the first reservoir for a subsequent starting operation. It is also possible, for example, to operate the diesel internal combustion engine in the region of full load if the actual hydrostatic drive were to require merely partial-load operation of said diesel internal combustion engine. In internal combustion engines, the efficiency is, as a rule, higher in the region of the full-load characteristic than in the partial-load region.

BRIEF DESCRIPTION OF THE DRAWINGS

Preferred developments of the method according to the invention will be described below with the aid of the drawings, in which.

DETAILED DESCRIPTION OF EXEMPLARY EMBODIMENTS

Figure 1:
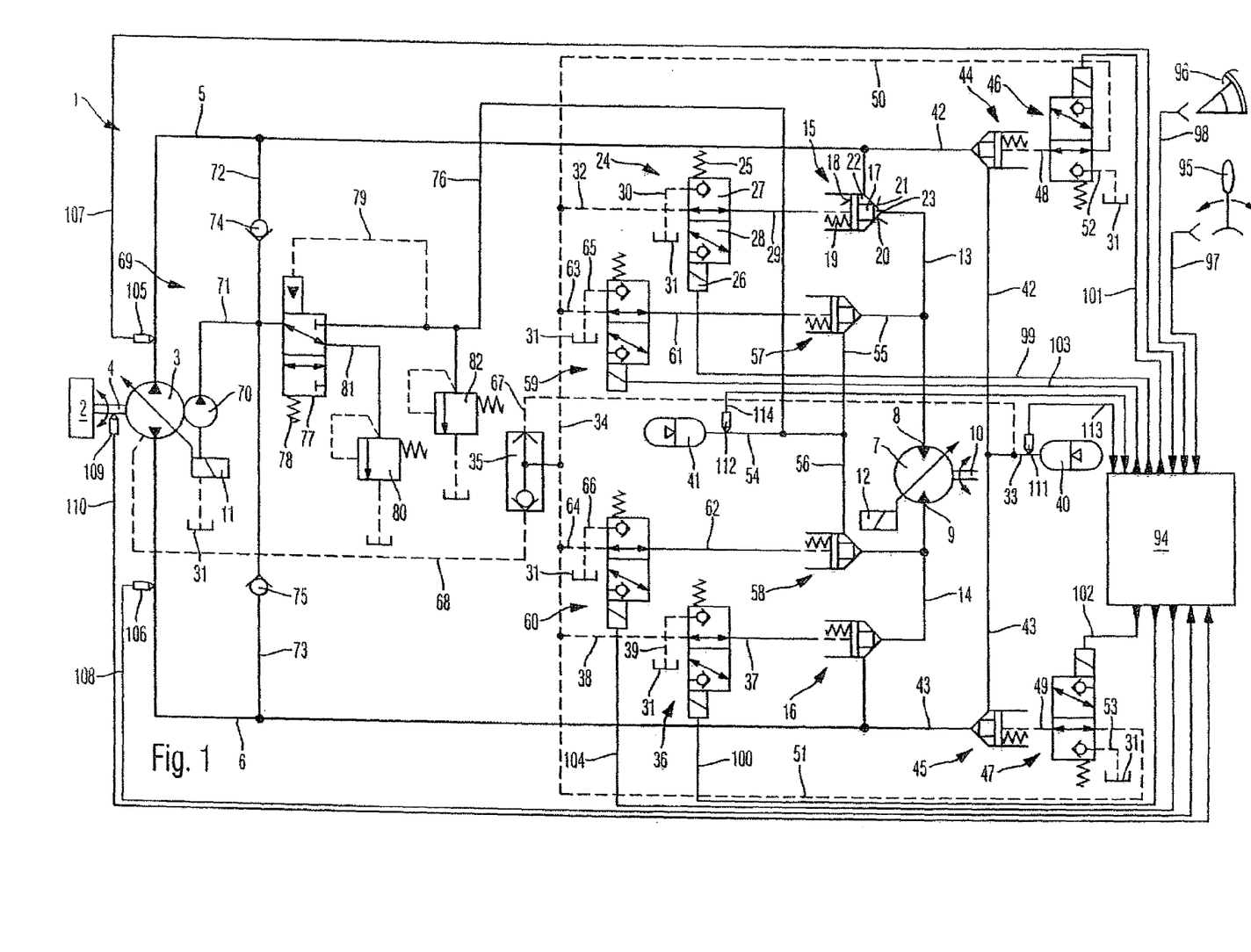
FIG. 1 shows a diagrammatic representation of a first exemplified embodiment of a hydrostatic drive according to the invention for carrying out the method according to the invention.

FIG. 1 shows a diagrammatic representation of a hydrostatic drive 1 according to the invention. Said hydrostatic drive 1 according to the invention may be, for example, a traction-type drive in a utility vehicle. However the invention is not limited to traction-type drives. On the contrary, all drives in which a hydrostatic transmission is used can be produced in the design according to the invention.

The hydrostatic drive 1 comprises a driving engine 2. Said driving engine 2 drives a hydraulic pump 3 via a drive shaft 4. The hydraulic pump 3 is an adjustable hydrostatic piston machine which is designed for delivery in two directions. Said hydraulic pump 3 effects delivery into a first working line 5 or a second working line 6, depending upon the direction of delivery which has been set. A hydraulic engine 7 can be connected to the first working line 5 and the second working line 6. Said hydraulic engine 7 has a first working-line connection 8 and a second working-line connection 9. The first working-line connection 8 can be connected to the first working line 5. In corresponding manner, the second working-line connection 9 can be connected to the second working line 6. If, as will be further described below, the first working-line connection 8 and the second working-line connection 9 are connected to the first working line 5 and second working line 6 respectively, the hydraulic pump 3 and the hydraulic engine 7 are connected to one another in a closed hydraulic circuit. The output moment generated by the hydraulic engine 7 when the latter is loaded is passed on, by an output shaft 10, for example to an axle of the vehicle or to a shift transmission connected on the downstream side.

A first adjusting device 11 is provided for setting the delivery volume of the hydraulic pump 3. The absorption volume of the hydraulic engine 7 is adjusted, in corresponding manner, by a second adjusting device 12. The first adjusting device 11 and second adjusting device 12 act on an adjusting mechanism, in each case, belonging to the hydraulic pump 3 and hydraulic engine 7 respectively.

A first connecting line 13 is connected to the first working-line connection 3 of the hydraulic engine 7. The second working-line connection 9 of the hydraulic engine 7 is connected to a second connecting line 14. Said first connecting line 13 can be connected to the first working line 5 via a first seat valve 15. The second connecting line 14 can be connected to the second working line 6 via a second seat valve 16.

All the seat valves in the hydrostatic circuit represented in FIG. 1 are made up in the same way. For the sake of clarity, only the make-up of the first seat valve 15 will be gone into in detail below.

Said first seat valve 15 has a piston 17. Said piston 17 has a control face 18 which can be loaded with a pressure. Said control face 18 is likewise acted upon by the force of a closing spring 19. A hydraulic force resulting from a control pressure and also the force of the closing spring 19 thus act upon the control face 18 and load the first seat valve 15 in the direction of closing. A sealing edge 20, which interacts with the sealing seat 21 in a sealing manner, is constructed on the piston 17. Within the first seat valve 15, a first chamber 22 and a second chamber 23 are disconnected from one another when said seat valve 15 is closed. The pressure in the first working line 5 and the pressure in the first connecting line 13 act within the first chamber 22 and the second chamber 23 respectively. The pressures prevailing in the first chamber 22 and second chamber 23 load the piston 17 with a hydraulic force which acts in the direction of opening of the first seat valve 15. If the hydraulic force on the control face 18 is reduced, the hydraulic force in the first chamber 22 and the second chamber 23 exceeds the force of the closing spring 19 acting in the direction of closing, and the first seat valve 15 is brought into its open position. When said first seat valve 15 is in the open position, the first chamber 22 and second chamber 23 are connected to one another, so that a connection through which flow can take place is established between the first working line 5 and the first connecting line 13. With the first seat valve 15 open, therefore, the first working-line connection 8 of the hydraulic engine 7 is loaded with pressure medium when the latter is delivered to the first working line 5 by the hydraulic pump 3.

In order to influence the control pressure acting upon the control face 18 of the first seat valve 15, a first pilot valve 24 is provided. Said first pilot valve 24 is a 3/2-way valve and is loaded with a force in a first direction by a valve spring 25. The force of an electromagnet 26 acts in the opposite direction. A different actuator may also be used, instead of the electromagnet 26. It is likewise possible to cause a hydraulic force to act upon the first pilot valve 24, in the opposite direction to the force of the valve spring 25. Said first pilot valve 24 is brought into its first switching position 27 or second switching position 28 in dependence upon the force ratio of the valve spring 25 and electromagnet 26. Under these circumstances, said valve spring 25 loads the first pilot valve 24 in the direction of its first switching position 27. In said first switching position 27, the first pilot valve 25 connects a first control-pressure line 29 to a first branch 32 of a pressure-infeed line.

When the first pilot valve 24 is in the first switching position 27, therefore, the pressure prevailing in the first branch 32 of the pressure-infeed line is fed, via the first control-pressure line 29 connected to said pilot valve, to the control face 18 of the first seat valve 15. Consequently, if the first pilot valve 24 is located in the first switching position 27, which is predetermined by the valve spring 25, the first seat valve 15 is loaded in the direction of closing. If, on the other hand, the electromagnet 26 is loaded with a control signal, a force which brings the first pilot valve 24 into its second switching position 28 against the force of the valve spring 25 acts upon said first pilot valve 24 through the electromagnet 26. In said second switching position 28, the first control-pressure line 29 is connected to a first pressure-relieving line 30. The pressure prevailing in the first control-pressure line 29 is relieved, via said first pressure-relieving line 30, into a tank volume 31. The hydraulic force which is acting upon the control face 18 of the first seat valve 15 accordingly declines, and said first seat valve 15 is brought into its open position by the hydraulic force in the first chamber 22 and also in the second chamber 23. As a result of the supplying of current to the electromagnet 26, a connection is thus established between the first working line 5 and the first working-line connection 8.

The pressure necessary for generating the control force on the control face 18 is fed in via the first branch 32 of the pressure-infeed line and the first pilot valve 24. For this purpose, said first branch 32 of the pressure-infeed line is connected to a pressure-infeed line 34. Said pressure-infeed line 34 is connected to an outlet of a changeover valve 35. The highest pressure available in the system at any given time is made available by said changeover valve 35 in a manner which will be further described below.

A second pilot valve 36 is provided for activating the second seat valve 16. Said second pilot valve 36 is made up in comparable manner to the first pilot valve 24. For the sake of clarity, a repeated description will be dispensed with. A second control-pressure line 27 can be connected to a second branch 38 of the pressure-infeed line by the second pilot valve 36. Said second pilot valve 36 is likewise held in this position by a spring. If the second pilot valve 36 is loaded with a control signal at an electromagnet, it is brought into its second switching position, in which the second control-pressure line 37 is connected to a second pressure-relieving line 39. When the second pilot valve 36 is loaded with a control signal, therefore, the control pressure acting upon the control face of the second seat valve 16 is reduced, through the fact that the second control-pressure line 37 is relieved of pressure into the tank volume 31. As a result of this, the second seat valve 16 is brought into its open position when a control signal is present at the pilot valve 36. When the second seat valve 16 is in the open position, the second connecting line 14 and the second working line 6 are connected to one another.

During a normal traction-type operation, both the first pilot valve 24 and the second pilot valve 36 are loaded with a control signal. The first control-pressure line 29 and the second control-pressure line 37 are therefore relieved of pressure into the tank volume 31, and the first seat valve 15 and second seat valve 16 are brought into their respective open position. By this means, a closed hydraulic circuit is constructed, through the fact that the hydraulic pump 3 and the hydraulic engine 7 are arranged, in a manner known per se, as a hydrostatic transmission. The transmission ratio of said hydrostatic transmission is set by setting the delivery volume of the hydraulic pump 3 or the absorption volume of the hydraulic engine 7 by means of the first adjusting device 11 or second adjusting device 12, respectively.

The hydrostatic drive 1 according to the invention also comprises a first reservoir 40 and a second reservoir 41. Said first reservoir 40 is designed as a high-pressure reservoir. Said second reservoir 41 is constructed as a low-pressure reservoir. Both reservoirs 40, 41 are preferably constructed as hydropneumatic reservoirs, in which a compressible volume is compressed when pressure medium is fed in.

The first reservoir 40 can be connected to the hydrostatic circuit via a high-pressure reservoir line 33. Said high-pressure reservoir line 33 branches into a first branch 42 and a second branch 43 of the high-pressure reservoir line. A third seat valve 44 is arranged in the first branch 42 of the high-pressure reservoir line and a fourth seat valve 45 is arranged in the second branch 43 of said high-pressure reservoir line. The third seat valve 44 and fourth seat valve 45 can likewise be loaded, in each case, with the control pressure in the direction of closing via a third control-pressure line 48 and a fourth control-pressure line 49, respectively. The third seat valve 44 and fourth seat valve 45 are acted upon, likewise in the direction of closing, by a closing spring in each case.

If the third seat valve 44 is located in its closed position, the first branch 42 of the high-pressure reservoir line is interrupted. If the fourth seat valve 45 is located in its closed position, the second branch 43 of the high-pressure reservoir line is interrupted.

The first branch 42 of the high-pressure reservoir line opens into the first working line 5. In corresponding manner, the second branch 43 of the high-pressure reservoir line opens into the second working line 6. If the third seat valve 44 and fourth seat valve 45 are located in their closed position in each case, there is thus no connection, through which flow can take place, from the first working line 5 to the first reservoir 40, and likewise no connection from the second working line 6 to the first reservoir 40.

When a third pilot valve 46 is in a first switching position, the third control-pressure line 48 is connected to a third branch 50 of the pressure-infeed line. Said third pilot valve 46 is loaded, in the direction of this switching position, with a valve spring. Acting in the opposite direction, once again, is an electromagnet which is able to load the third pilot valve 46 with a force, in a manner which has already been described, against the force of the valve spring. If said electromagnet is loaded with a control signal, it brings the third pilot valve 46 into its second switching position. In this position, the third control-pressure line 48 is connected to a third pressure-relieving line 52, so that said third control-pressure line 48 is relieved of pressure into the tank volume 31. As a result of this, the third seat valve 44 is brought into its open position by the pressure prevailing in the first branch 42 of the high-pressure reservoir line. When said third seat valve 44 is in the open position, the first working line 5 is connected to the first reservoir 40 via the first branch 42 of the high-pressure reservoir line and via said high-pressure reservoir line 33.

In a manner corresponding to the arrangement described above, the fourth seat valve 45 can also be activated by a fourth pilot valve 47. A fourth control-pressure line 49 can be connected, via said fourth pilot valve 47, either to a fourth branch 51 of the pressure-infeed line or to a fourth pressure-relieving line 53. When said fourth pilot valve 47 is in the inoperative position, it connects the fourth control-pressure line 49 to the fourth branch 51 of the pressure-infeed line. When an electromagnet is loaded, the fourth pilot valve 47 is adjusted into its second switching position, in which the fourth control-pressure line 49 is connected to the fourth pressure-relieving line 53. This leads, in the manner which has already been described, to opening of the fourth seat valve 45. When said seat valve 45 is in the open position, the second working line 6 is connected to the first reservoir 40 via the second branch 43 of the high-pressure reservoir line. The second reservoir 41 is designed as a low-pressure reservoir and can be connected to the hydraulic circuit via a low-pressure reservoir line 54. Said low-pressure reservoir line 54 branches into a first branch 55 and a second branch 56 of said low-pressure reservoir line. A fifth seat valve 57 is arranged in the first branch 55 of the low-pressure reservoir line, and a sixth valve 58 is arranged in the second branch 56 of said low-pressure reservoir line. The first branch 55 of the low-pressure reservoir line opens into the first connecting line 13.

The second branch 56 of the low-pressure reservoir line opens into the second connecting line 14. By this means, the connection between the first connecting line 13 and the low-pressure reservoir line 54 is interrupted when the fifth seat valve 57 is in the closed position. Likewise, the sixth seat valve 58 interrupts the connection between the second connecting line 14 and the low-pressure reservoir line 54.

The fifth seat valve 57 is activated by a fifth pilot valve 59. In order to load said fifth seat valve 57 in the direction of closing with a hydraulic force, the fifth pilot valve 59 connects a fifth control-pressure line 61 to a fifth branch 63 of the pressure-infeed line. If, on the other hand, the fifth pilot valve 59 is loaded with a control force at an electromagnet, said fifth pilot valve 59 is brought, against the force of its valve spring, into its second switching position, in which the fifth control-pressure line 51 is connected to a fifth pressure-relieving line 65. As a consequence of the relieving of the pressure prevailing in the fifth control-pressure line 61 into the tank volume 31, the fifth seat valve 57 opens and the first connecting line 13 is connected to the low-pressure reservoir line 54, and thus to the second reservoir 41, via the first branch 55 of said low-pressure reservoir line.

In corresponding manner, the sixth seat valve 58 is activated by a sixth pilot valve 60. In its inoperative position, which once again is defined by a valve spring, a sixth control-pressure line 62 is connected to a sixth branch 64 of the pressure-infeed line by the sixth pilot valve 60.

If, on the other hand, said sixth pilot valve 60 is loaded with a control signal, it is brought into its other end position by its electromagnet against the force of the valve spring. In the said end position, the sixth control-pressure line 62 is connected to a sixth pressure-relieving line 66. The pressure medium escaping into the tank volume 31 from the sixth control-pressure line 62 via the sixth pressure-relieving line 60 leads to a reduction in the control force at the sixth seat valve 58. As a result of the reduction in the control force which loads said sixth seat valve 58 in its direction of closing, a preponderance of the forces acting in the opposite direction occurs, which is generated by the pressures acting in the second branch 56 of the low-pressure reservoir line. As a result of this, the sixth seat valve 58 is brought into its open position, in which a connection through which flow can take place exists in the second branch 56 of the low-pressure reservoir line.

The first to sixth branches 32, 38, 50, 51, 63 and 64 of the pressure-infeed line are connected to a pressure-infeed line 34. Said pressure-infeed line 34 is connected to an outlet of the changeover valve 35. Emerging at the two inlets to the changeover valve 35 are a reservoir-connecting line 67 and a pump-connecting line 68 respectively. Via the reservoir-connecting line 67, the inlet to the changeover valve 35 is loaded with the pressure prevailing in the high-pressure reservoir line 33, and thereby with the pressure prevailing in the first reservoir 40. The higher of the pressures in the first or second working line 5, 6 at any given time acts at the other inlet to the changeover valve 35 via the pump-connecting line 68. The highest pressure available in the system at any given time is thereby made available by the changeover valve 35 at its outlet for the purpose of activating the seat valves 15, 16, 44, 45, 57, 58.

The hydrostatic drive 1 also comprises a feed apparatus 69. Said feed apparatus 69 has a feed pump 70. Said feed pump 70 is intended for delivery in only one direction and is preferably designed as a fixed-displacement pump. It is arranged, together with the adjustable hydraulic pump 3, on the drive shaft 4 and is thus driven via the driving engine 2. The feed pump 70 sucks pressure medium out of the tank volume 31 and delivers it to a feed line 71. Said feed line 71 branches into a first branch 72 which is connected to the first working line 5, and a second branch 73 which is connected to the second working line 6. A first non-return valve 74 is provided in the first branch 72 of the feed line, and a second non-return valve 75 is provided in the second branch 73 of said feed line. The two non-return valves 74 and 75 are arranged in such a way that they open towards the first working line 5 and second working line 6, respectively, if the pressure in the feed line 71 is greater than the working-line pressure, at the time in question, in said first working line 5 or second working line 6, respectively.

In order to safeguard the hydrostatic drive 1, a pressure-limiting valve, which relieves the pressure in the respective working line 5, 6 in the direction of the feed line 71 if a critically high pressure occurs, may be arranged in a parallel manner, in each case, as a supplement to the first non-return valve 74 and to the second non-return valve 75.

The feed apparatus 69 can be connected to the second reservoir 41 via a pressure-maintaining line 76. For this purpose, said pressure-maintaining line 76 connects an outlet of a switching valve 77 to the low-pressure reservoir line 54. Said switching valve 77 is located in a first or second switching position, in dependence upon the force of a compression spring 78 and a hydraulic force acting in the opposite direction. If said hydraulic force is greater than the force of the compression spring 78, the switching valve 77 connects the feed line 71 to a discharge line 81. Said discharge line 81 can be connected to the tank volume 31 via a first pressure-limiting valve 80. If the hydraulic force at the switching valve 77 is below the force of the compression spring 78, the latter displaces said switching valve 77 into its other switching position, in which the feed line 71 is connected to the pressure-maintaining line 76.

The pressure in said pressure-maintaining line 76 is fed to the measuring face by the comparison line 79. The switching valve 77 thus switches into its first or second switching position in dependence upon the pressure prevailing in the second reservoir 41. The pressure-maintaining line 76 can be connected to the tank volume 31 via a second pressure-limiting valve 82.

As soon as the pressure in the second reservoir 41 falls below a value which is set by the compression spring 78, the switching valve 77 is brought into a switching position in which the feed line 71 is connected to the pressure-maintaining line 76. In this switching position, pressure medium is delivered to the second reservoir 41 by the feed pump 70. As a result of this, the pressure in the second reservoir 41 rises until an adequate pressure is reached and, as a result of this, the hydraulic force acting upon the switching valve 77 brings the latter into its opposite switching position. In this opposite switching position, the pressure prevailing in the feed apparatus 69 is limited by the pressure-limiting valve 80. The first pressure-limiting valve 80 is preferably set to 20 bar. The second pressure-limiting valve 82, on the other hand, is set to a higher pressure, for example 40 bar, which corresponds to the switching pressure of the switching valve 77.

It is thus guaranteed, with the aid of the connection from the feed apparatus 69 to the second reservoir 41, that pressure medium which escapes from the circuit through leakage during regenerative operation of the hydrostatic drive 1 is fed in again.

As has already been stated by way of introduction, a closed hydraulic circuit in which the hydraulic pump 3 and hydraulic engine 7 are arranged is provided during normal traction-type operation. For this purpose, the first pilot valve 24 and the second pilot valve 36 are loaded with a control signal. The first seat valve 15 and second seat valve 16 are in their open position, and the closed hydraulic circuit consists of the first working line 5, the first connecting line 13, the second connecting line 14 and the second working line 6. For the purposes of the description that follows, it will be assumed that forward travel means the delivery of pressure medium to the first working line 5 by the hydraulic pump 3. In the case of forward travel, therefore, said first working line 5 is the working line on the delivery side, and the second working line 6 is the working line on the suction side.

Adopting forward travel as the starting point, the vehicle under consideration is, first of all, to move into overrunning-type operation, or to be retarded. In overrunning-type operation, the first reservoir 40 is used for storing the vehicle's kinetic energy. Pressure medium is therefore to be delivered to said first reservoir 40 by the hydraulic engine 7, which is now acting as a pump. During the braking operation, pressure medium is removed from the second reservoir 41 and pumped into the first reservoir 40 by the hydraulic engine 7. For this purpose, the fifth pilot valve 59 is loaded with a control signal in the case of the forward travel described. As a result of this, the fifth seat valve 57 is in its open position and pressure medium can be sucked in from the second reservoir 41, via the first branch 55 of the low-pressure reservoir line, by the hydraulic engine 7 at the latter's first working-line connection 8. The pressure medium sucked in by the hydraulic engine 7 from the second reservoir 41 is delivered to the second connecting line 14 by the hydraulic engine 7.

The second pilot valve 36 is likewise loaded with a control signal, so that the second seat valve 16 is likewise in its open position. The fourth pilot valve 47 is also loaded with a control signal and the fourth seat valve 45 is likewise brought into its open position by the pressure in the second branch 43 of the high-pressure reservoir line. On the other hand, the remaining pilot valves 46, 24 and 60 are loaded only by their respective valve springs, and the associated seat valves 44, 15 and 58 are in their closed position.

The pressure medium delivered by the hydraulic engine 7 is consequently delivered, via the second connecting line 14, towards the second working line 6 and onwards, via the second branch 43 of the high-pressure reservoir line, to the first reservoir 40.

After a braking operation of this kind, pressure medium is stored under high pressure in the first reservoir 40. Under these circumstances, the stored pressure energy is produced by the breaking-down of the kinetic energy of the vehicle. If, after a braking operation during forward travel which has been described in such a way, there is to be renewed acceleration in the direction of forward travel, the pressure medium must be fed from the first reservoir 40 to the hydrostatic drive 1 in a suitable manner. According to the invention, the removal of the pressure medium from the first reservoir 40 takes place into the working line which is on the suction side at any given time, that is to say, on the suction side of the hydraulic pump 3. In the case of forward travel, the working line on the suction side is the second working line 6. For the purpose of removing pressure medium, and therefore recuperating energy, the fourth pilot valve 47 is loaded with a control signal. The fourth seat valve 45 is brought into the open position, and the pressure medium from the first reservoir 40 is fed to the second working line 6 and thereby to the suction side of the hydraulic pump 3. The latter thus effects sucking-in from the second working line 6, which is under an initial pressure, and said hydraulic pump 3 can additionally be loaded with the torque of the driving engine 2. This leads to an addition of the moments, and the driving engine 2 can be operated with a lower output. The result is a saving of fuel. The hydraulic engine 7 is loaded with the pressure in the first working line 5. For this purpose, the first pilot valve 24 is loaded with a control signal, so that the first seat valve 15 is in its open position. The first working-line connection 8 of the hydraulic engine 7 is thus connected to the working line 5 on the delivery side. The pressure medium passing out of the hydraulic engine 7 downstream at the second working-line connection 9 is relieved of pressure, generating an output torque at the output shaft 10 in the process, and is delivered to the second reservoir 41 via the open sixth seat valve 58. For the purpose of opening said sixth seat valve 58, the sixth pilot valve 60 is loaded with a control signal. The remaining seat valves (16, 44 and 57) are each in their closed position, in which the associated pilot valves (36, 46 and 59) are not loaded with a control signal.

In a corresponding manner, both the storage of the kinetic energy and also its recuperation are possible in the course of rearward travel. Rearward travel leads to a reversal of the lines which are on the suction and delivery sides with respect to the hydraulic pump 3. Adopting the example described above as the starting point, therefore, the second working line 6 is the working line which is on the delivery side with respect to the hydraulic pump 3, and the first working line 5 is the working line which is on the suction side with respect to said hydraulic pump 3 in the case of rearward travel. Consequently, the direction of flow through the hydraulic engine 7 also changes, so that, in the case of rearward travel, the first working-line connection 8 of the hydraulic engine 7 is the downstream working-line connection, and the second working-line connection 9 is the upstream working-line connection of said hydraulic engine 7. In order to represent the respective switching states again in a clear manner, both an accelerating operation and a braking operation are represented for forward and rearward travel in the table below. For the sake of simplicity, only those pilot valves which are loaded with a control signal are indicated. This means that none of the remaining pilot valves receives a control signal, and the seat valves associated with them are in the closed position.

|  | Supplied with current (pilot valve) | Open (seat valve) |
| --- | --- | --- |
| Accelerate forwards | 24, 47, 60 | 15, 45, 58 |
| Brake forwards | 36, 47, 59 | 16, 45, 57 |
| Accelerate rearwards | 36, 46, 59 | 16, 44, 57 |
| Brake rearwards | 24, 46, 60 | 15, 44, 58 |

When the driving throttle is operated, the pilot valves 24, 36, 46, 47 and also 59 and 60 are activated by an electronic control appliance 94. Said electronic control appliance 94 ascertains, starting from a desire regarding travel which is specified by the operator, the switching states of the individual pilot valves 24, 36, 46, 47, 59 and 60 for that operating state of the drive which corresponds to the desire regarding travel.

The operator specifies his desire regarding travel via a driving throttle 95 and a braking apparatus, for example a brake pedal 96. The signals from the driving throttle 95 or brake pedal 96 are transmitted to the electronic control appliance 94 via a first signal line 97 or a second signal line 98 respectively. On the basis of the positional setting of the driving throttle 95 and brake pedal 96, the electronic control appliance 94 ascertains the state of travel of the vehicle which is driven via the hydrostatic drive 1. The pilot valves are activated in a corresponding manner, as shown in the above table, in order to set the "acceleration forwards", "braking forwards", "acceleration rearwards", "braking rearwards" states of travel.

For the purpose of activating the pilot valves, the electronic control appliance 94 is connected to the electromagnets of the pilot valves 24, 36, 46, 47, 59 and 60 via first to sixth control lines 99 to 104. Information about the pressure prevailing in the first working line 5 or second working line 6 on the suction side or delivery side is also fed to the electronic control appliance 94. A first pressure sensor 105 is arranged, for this purpose, in the first working line 5. A second sensor 106 is arranged, in corresponding manner, in the second working line 6. The first pressure sensor 105 and second pressure sensor 106 are connected to the electronic control appliance 94 via a first sensor line 107 and a second sensor line 108 respectively. It is thereby possible to measure a minimum pressure rise via the hydraulic pump 3. This will be further explained in detail below, when the method of controlling the hydrostatic drive 1 is explained.

A rotational-speed sensing element 109 is also arranged on the drive shaft 4. The rotational speed of said drive shaft 4 is ascertained with the aid of said rotational-speed sensing element 109. By this means, the driving engine 2 can be incorporated into the method of controlling the hydrostatic drive 1, in the same way as through the evaluation of the signals from the first and second pressure sensors 105 and 106. The rotational-speed sensing element 109 is likewise connected to the electronic control appliance 94 via a third sensor line 110.

In order to assess whether accelerated travel using the stored pressure energy from the first reservoir 40 is economic, it is necessary to know the state of charge of said first reservoir 40 and of the second reservoir 41. For this purpose, a high-pressure sensor 111 and a low-pressure sensor 112 are arranged in the high-pressure reservoir line 33 and low-pressure reservoir line 54 respectively. The high-pressure sensor 111 transmits its signal, by means of which the pressure in the first reservoir 40 is ascertained, to the electronic control appliance 94 via a fourth sensor line 113. In corresponding manner, the low-pressure sensor 112 measures the pressure in the low-pressure reservoir line 54. The pressure in said low-pressure reservoir line 54 coincides with the pressure prevailing in the second reservoir 41. The electrical signal, which corresponds to the pressure prevailing in the second reservoir 41, is transmitted to the electronic control appliance 94 via a fifth sensor line 114.

Figure 2:
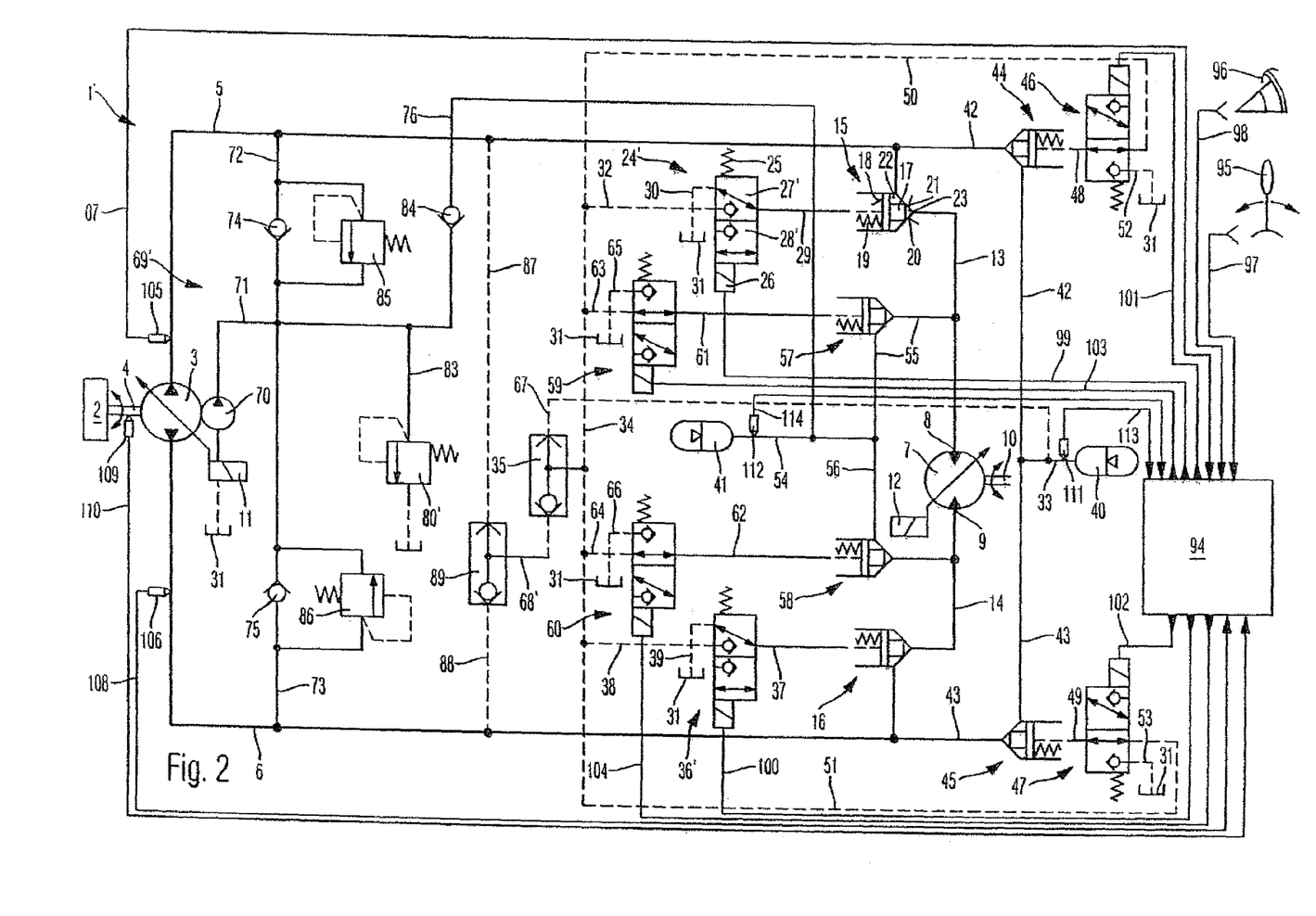
FIG. 2 shows a diagrammatic representation of a second exemplified embodiment of a hydrostatic drive according to the invention for carrying out the method according to the invention.

A second exemplified embodiment of the hydrostatic drive 1' according to the invention is represented in FIG. 2. In this connection, the same reference numerals are used for the same structural elements in order to avoid unnecessary repetitions. Said elements will not be described again.

Unlike the exemplified embodiment in FIG. 1, in the second exemplified embodiment in FIG. 2, only one feed-pressure-limiting valve 80' is provided instead of the first pressure-limiting valve 80 and second pressure-limiting valve 82. Said feed-pressure-limiting valve 80' is connected to the feed line 71 via a feed-pressure-limiting line 83. Said feed line 71 is also connected to the pressure-maintaining line 76. A third non-return valve 84 is provided at the transition from the feed line 71 to said pressure-maintaining line 76. Said third non-return valve 84 may advantageously also be used in the exemplified embodiment in FIG. 1.

The third non-return valve 84 opens towards the pressure-maintaining line 76. The feed-pressure-limiting valve 80' brings about the limiting of the pressure in the feed line 71 to a maximum admissible feed pressure. The latter is, for example, 25 bar. If a pressure which exceeds this maximum admissible feed pressure prevails in the second reservoir 41, the third non-return valve 84 moves into its closed position and thus disconnects the second reservoir 41 from the modified feed apparatus 69'. If, however, the pressure in the second reservoir 41 has fallen below the feed pressure, for example because of leakage, the third non-return valve 84 opens and the second reservoir 41 is filled from the modified feed apparatus 69' with the aid of the feed pump 70.

Also in contrast to the exemplified embodiment in FIG. 1, the higher of the two working line pressures, at any given time, in the first working line 5 and second working line 6 respectively, is not fed directly to the changeover valve 35 via the hydraulic pump 3. Rather, an additional changeover valve 89 is provided. Said additional changeover valve 89 is connected to the first working line 5 via a first changeover-valve line 87. The additional changeover valve 89 is connected to the second working line 6 via a second changeover-valve line 88. The outlet of the additional changeover valve 89, at which the higher of the two working-line pressures at any given time is present, is connected to an inlet of the changeover valve 35 via a changeover-valve-connecting line 68'. Via the changeover valve 35, the higher of the two working-line pressures is thus compared, as was previously the case in the exemplified embodiment in FIG. 1, with the pressure prevailing in the reservoir-connecting line 67, and the highest pressure is fed to the pressure-infeed line 34.

Also, in the case of the first pilot valve 24' and second pilot valve 36' in the second exemplified embodiment, the first switching position 27' and the second switching position 28' are exchanged with one another, compared with the first exemplified embodiment. By this means, the first branch 32 of the pressure-infeed line is connected to the first control-pressure line 29, when the first pilot valve 24' is in the inoperative state which is determined by the valve spring 25. Accordingly, the second branch 38 of the pressure-infeed line is connected to the second control-pressure line 37 when the second pilot valve 36' is in the inoperative position. What is achieved by this means is that, during normal hydrostatic traction-type operation, the first seat valve 15 and the second seat valve 16 are each in their open position and the hydraulic pump 3 and hydraulic engine 7 are connected to one another in a simple, closed hydraulic circuit via the first working line 5, the second working line 6 and also the first connecting line 13 and second connecting line 14. It is not necessary to supply the electromagnets of the pilot valves 24' and 36' with current.

For the purpose of safeguarding the first working line 5 and second working line 6 against superelevated working-line pressures, a first parallel pressure-limiting valve 85 is arranged parallel to the first non-return valve 74. Said first parallel pressure-limiting valve 85 opens towards the feed line 71, if the pressure in the first working line 5 exceeds a value which is set by a spring belonging to said first parallel pressure-limiting valve 85.

A second parallel pressure-limiting valve 86 is provided in a comparable manner. Said second parallel pressure-limiting valve 86 is arranged parallel to the second non-return valve 75. It opens if the pressure in the second working line 6 exceeds the critical pressure set at the second parallel pressure-limiting valve 86 by an additional spring.

Figure 3:
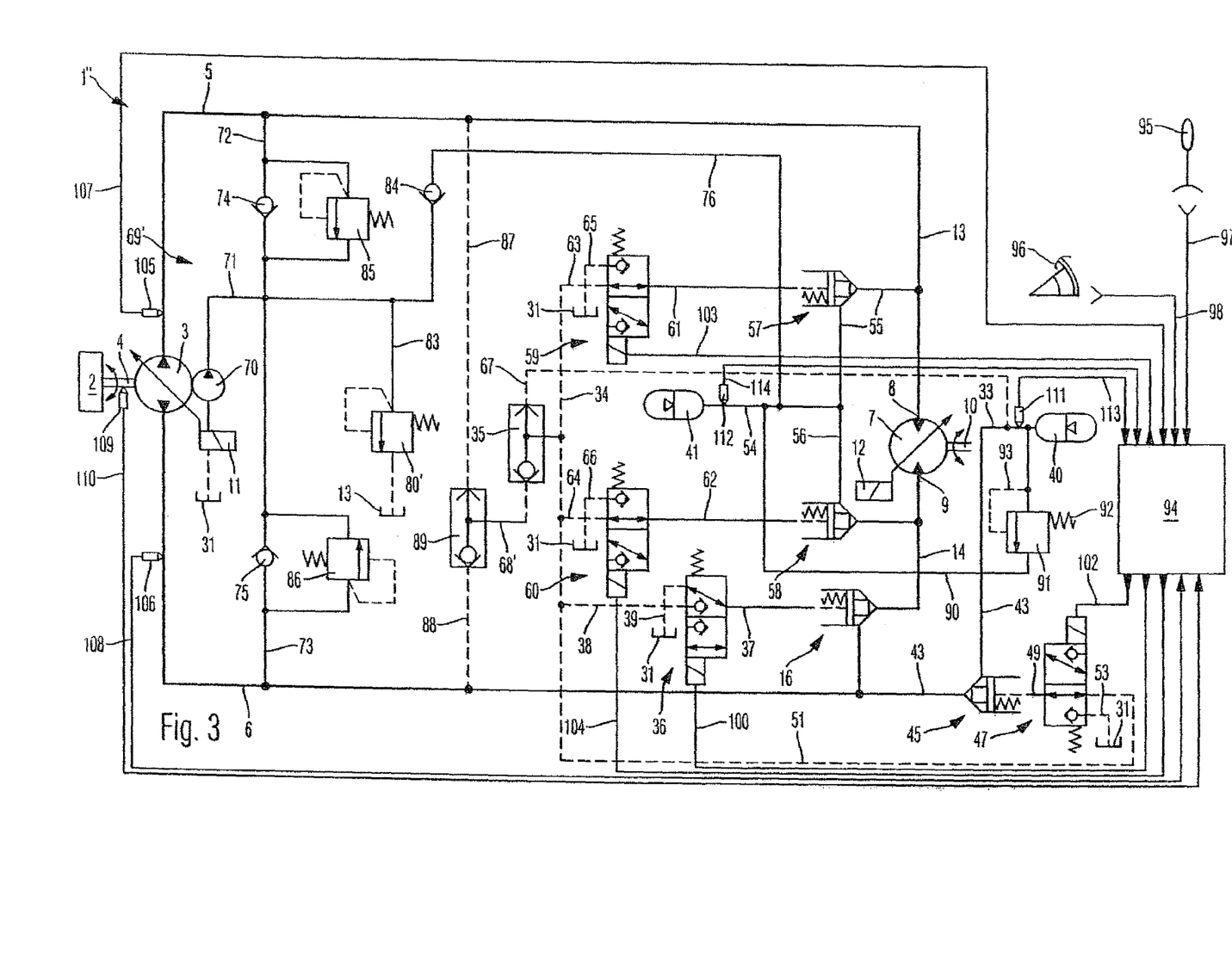
FIG. 3 shows a diagrammatic representation of a third exemplified embodiment of a hydrostatic drive according to the invention for carrying out the method according to the invention.

In the third exemplified embodiment, which is represented in FIG. 3, of a hydrostatic drive 1" according to the invention, recuperation of kinetic energy is provided for only in the case of one direction of travel. This direction of travel corresponds to the forward travel described above, in which the hydraulic pump 3 effects delivery to the first working line 5. The structural outlay for a hydrostatic drive 1" of this kind, which provides for the recuperation of energy only in the case of one direction of travel, is considerably diminished. In particular, therefore, there is just as little need for the first pilot valve 241 and also for the first seat valve 15 as there is for the third pilot valve 46 and also for the third seat valve 44, and for the lines which are accordingly not required. The third exemplified embodiment shown in FIG. 3 is based on the exemplified embodiment shown in FIG. 2, so that the remaining elements coincide with those already described in connection with FIG. 2.

In addition, a safety line 90 is provided in the exemplified embodiment in FIG. 3. Said safety line 90 connects the low-pressure reservoir line 54 to the high-pressure reservoir line 33. A reservoir-pressure-limiting valve 91 is arranged in said safety line 90. Said reservoir-pressure-limiting valve 91 safeguards the first reservoir 40 against an inadmissible superelevation of pressure. At the same time, it makes it possible for hydrostatic braking to continue to be carried out by the hydrostatic drive 1", even when the first reservoir 40 is already fully charged up. For this purpose, a boundary value for the pressure in the first reservoir 40 is set by a reservoir-pressure-limiting valve spring 92. This boundary value corresponds to the pressure in the first reservoir 40 when the latter is in the maximum state of charge.

The pressure in the first reservoir 40, which pressure prevails in the high-pressure reservoir line 33 which is connected to the safety line 90, is fed to a pressure-measuring face of the reservoir-pressure-limiting valve 91 via a measuring line 93. The hydrostatic pressure generated at that point acts against the force of the reservoir-pressure-limiting valve spring 92. If the first reservoir 40 is completely full, the reservoir-pressure-limiting valve 91 opens and connects the high-pressure reservoir line 33 to the low-pressure reservoir line 54. In over-running-type operation, the hydraulic engine 7 thereby no longer delivers the pressure medium to the first reservoir element 40, but back to the low-pressure reservoir line 54 via the safety line 90 and the reservoir-pressure-limiting valve 91 arranged therein. A closed hydraulic circuit is thus produced, in which the reservoir-pressure-limiting valve 91 throttles the volume flow and a braking action is thus generated. By this means, hydrostatic braking can take place, even when the first reservoir 40 is fully charged, without volume-balancing being necessary.

The way in which the method of controlling the drive, as represented in one of FIGS. 1 to 3, is carried out, we explained below. The following explanations on the carrying-out of the individual steps of the method refer to FIG. 2 and the hydrostatic drive 1' represented therein. The explanations apply, in a comparable manner, to the drives 1 and 1" according to FIGS. 1 and 3.

In particular, the following explanations are also representative for a reversal of the direction of travel. In order to avoid unnecessary repetitions, however, the following explanations relate to travel in the forward direction. In the case of travel in the forward direction, it will once again be assumed that the hydraulic pump 3 is delivering pressure medium to the first working line 5.

Figure 4:
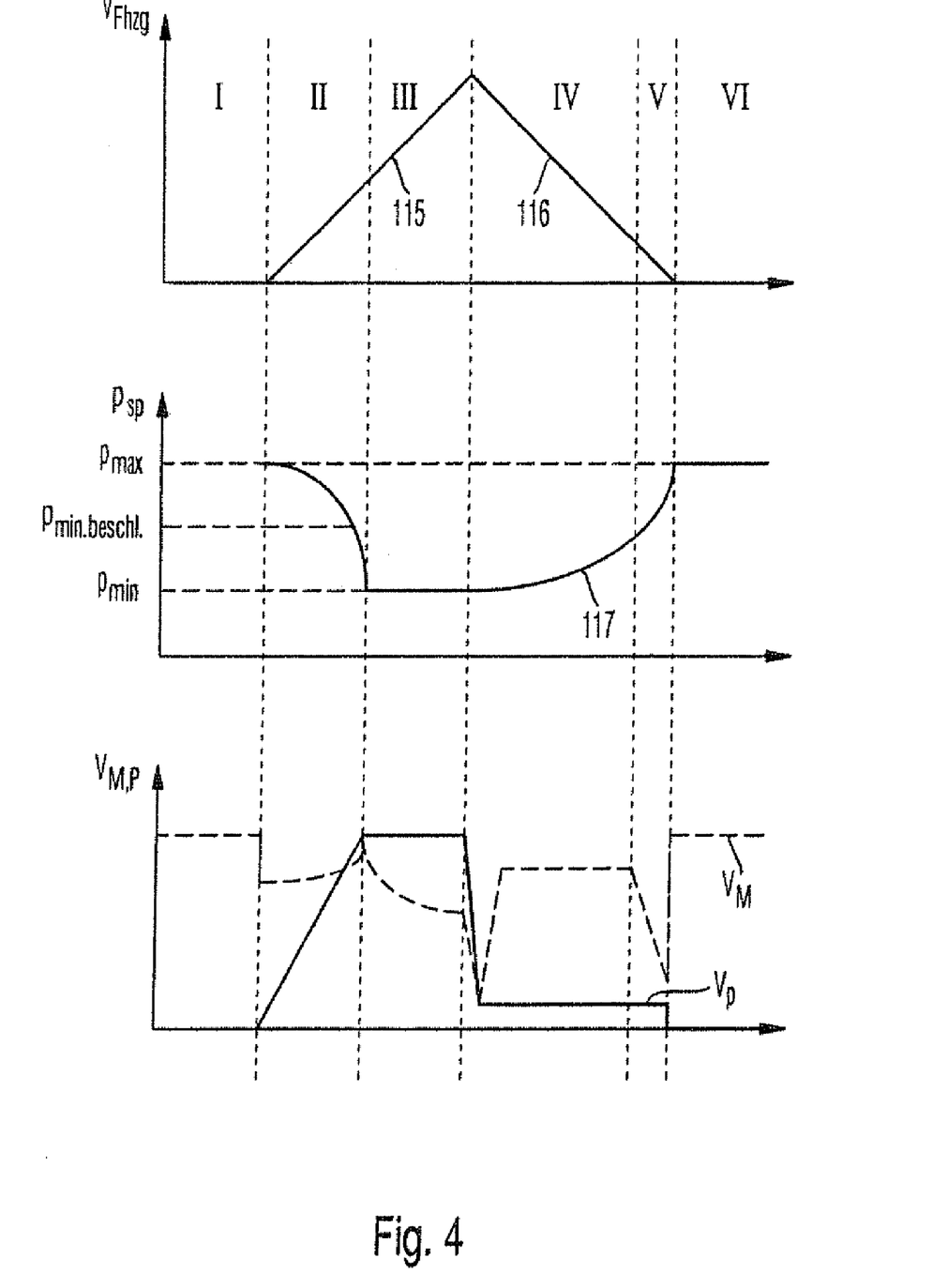
FIG. 4 shows a diagrammatic representation of the states of the drive as the method according to the invention runs its course.

A total of six sections I-VI are represented in FIG. 4. Each of the individual sections corresponds to a specific state of travel. Section I corresponds to a stationary state of the vehicle. In section II, the vehicle driven by the hydrostatic drive 1' is being accelerated while recuperating the pressure energy stored in the first reservoir 40. In this connection, the starting point adopted is that the first reservoir is already charged up in section I. The various possible ways of charging up the first reservoir 40 will be further explained below.

In the third section III, the vehicle is being driven with an ordinary hydrostatic drive, that is to say, without the recuperation of reservoir energy. Section IV shows deceleration of the vehicle. Under these circumstances, the vehicle passes over into overrunning-type operation and charges up the first reservoir 40. Section V characterises the transition between hydrostatic braking of the vehicle and the stationary state of the vehicle which is being driven. Finally, Section VI relates once again to the stationary state of the vehicle, such as occurs, for example, in a parking position.

In the topmost diagram in FIG. 4, only the speed of travel $v_{Fhzg}$ of the vehicle driven by the hydrostatic drive 1 is represented for the purpose of characterising the individual sections. In FIG. 4, the first line 115 represents accelerated travel from standstill up to a maximum speed. It is followed, in regions IV and V, by a second line 116 which shows the deceleration of the vehicle.

The path of the pressures in the first reservoir 40 in the respective sections I to VI is represented in the middle diagram in FIG. 4, starting from a fully charged first reservoir 40. The first reservoir 40 is, first of all, charged up to its maximum reservoir pressure $p_{max}$ in section I. The vehicle is accelerated in section II, starting from this maximum reservoir pressure $p_{max}$, by removing pressure medium from the first reservoir 40. In a manner corresponding to the acceleration, the pressure $p_{sp}$ in the first reservoir 40 falls as a result of the removal of the pressure medium required for acceleration purposes from the reservoir, until there is a minimum pressure $p_{min}$ in said first reservoir 40. According to the representation of the exemplary travel cycle, this minimum pressure $p_{min}$ in said first reservoir 40 is reached even before the acceleration of the vehicle is brought to an end. Therefore, provision is made, at the transition between sections II and III, for a changeover from an accelerated state of travel, with recuperation of the stored pressure energy, to normal a normal hydrostatic traction-type drive. In the region III, in which the vehicle is driven solely by the driving engine 2, the pressure in the first reservoir 40 does not change. The minimum reservoir pressure $p_{min}$ continues to prevail therein.

The vehicle then passes over into overrunning-type operation, in which it is hydrostatically braked. In this section IV, the reservoir pressure in the first reservoir 40 rises again, as is represented by the path of the curve 117 in the middle diagram in FIG. 4. Represented in FIG. 4 is an idealised path in which the pressure rise during the braking operation in regions IV and V is just sufficiently great for the maximum reservoir pressure $p_{max}$ to be reached again in the first reservoir 40. In the parking position in section VI, said first reservoir 40 is uncoupled in order to prevent leakage from it. The pressure p which is reached in the first reservoir 40 at the end of the braking operation in section V is therefore maintained, even in the subsequent parking situation in section VI.

The path of the delivery volume of the hydraulic pump 3 which has been set and of the absorption volume of the hydraulic engine 7 which has been set is represented schematically and in greatly simplified form in the bottommost diagram in FIG. 4. The corresponding paths $V_P$ and $V_M$ will be further explained below in the detailed description of the individual states of travel.

Before accelerated travel with the recuperation of the stored pressure energy can be carried out, it is first of all ascertained, at the transition from section I to section II, whether an adequate pressure is prevailing in the first reservoir 40. For this purpose, the signal from the high-pressure sensor 111 is evaluated by the electronic control appliance 94. If the signal supplies a value for the pressure in the first reservoir 40 which is greater than a minimum acceleration pressure $P_{min\_besch}$, an acceleration with the recuperation of stored energy can take place. As has already been explained above, for acceleration with the recuperation of stored energy, the first reservoir 40 is connected to the suction side of the hydraulic pump 3. In the present exemplified embodiment, in which forward travel is described, the suction side of the hydraulic pump 3 is the second working line 6. Before the high-pressure reservoir line 33 is connected to said second working line 6, however, the second seat valve 16 is first of all brought into its closed position. For this purpose, the second pilot valve 36' is supplied with current and thereby brought into its second switching position. In said second switching position, the second control-pressure line 37 is connected to the pressure-infeed line 34. As a result of this, the second seat valve 16 is brought into its closed position. In the closed position, the second connecting line 14 is disconnected from the second working line 6. The fourth seat valve 45 is now opened. For the purpose of opening said fourth seat valve 45, the electromagnet of the fourth pilot valve 47 is loaded with a control signal via the fourth control line 102. Because of the pressure in the second working line 6, and also of the pressure in the high-pressure reservoir line 33, or rather in the second section 43 of said high-pressure reservoir line, the fourth seat valve 45 is brought into its open position. In the open position, the pressure medium which is under pressure in the first reservoir 40 can be fed to the suction side of the hydraulic pump 3.

The sequence in the switching of the seat valves when switching over to a combined traction operation, in which recuperation of the pressure energy stored in the first reservoir 40 takes place, prevents the pressure medium which is stored under pressure in the first reservoir 40 from acting upon the downstream side of the hydraulic engine 7. This prevents a pressure surge on said hydraulic engine 7. Under these circumstances, the time displacement between the closing of the second seat valve 16 and the opening of the fourth seat valve 45 is fixed by a first time interval. This first time interval preferably takes into account the valve dynamics of the seat valves 16, 45, and preferably also the switching times or resetting times of the corresponding pilot valves 36' and 47.

For balancing the volume flow, it is also still necessary to connect the downstream side of the hydraulic engine 7 to the second reservoir 41. For this purpose, the sixth pilot valve 60 is activated by the electronic control appliance 94. In order to do so, the electromagnet of said sixth pilot valve 60 is loaded with a control signal via the sixth control line 104. As a result of this, the sixth pilot valve 60 is brought into its second switching position. In the second switching position, the sixth seat valve 58 is relieved of pressure into the tank volume 31 via the sixth control-pressure line 62. Said sixth seat valve 58 is therefore brought into its open position, and the downstream connection 9 of the hydraulic engine 7 is connected to the low-pressure reservoir line 54 and thereby to the second reservoir 41.

The pressure medium which is removed from the first reservoir 40 under pressure thus flows, via the second working line 6, to that connection of the hydraulic pump 3 which is on the suction side. Said pressure medium flows onwards, via the first working line 5, to the upstream connection 8 of the hydraulic pump 7. There, it is relieved of pressure via the hydraulic engine 7, which generates an output torque at its output shaft 10. The opening of the first seat valve 15 and of the fourth seat valve 45 can take place simultaneously.

The pressure made available to the hydraulic engine 7 at its upstream working-line connection 8 is brought about, on the one hand, by the reservoir pressure $p_{sp}$ in the first reservoir 40 and, on the other hand, by a pressure increase $\Delta p$ generated by means of the hydraulic pump 3. In order to bring about a further pressure increase by means of said hydraulic pump 3, a driving torque is fed to said pump via the drive shaft 4.

By this means, an addition of moments is achieved. In order to avoid an unnecessary wastage of energy by the driving engine 2, which is generally designed as a diesel internal combustion engine, passage of the latter into overrunning-type operation is avoided. In order to prevent this, the engine moment generated by the hydraulic engine 7 is monitored. For this purpose, said hydraulic engine 7 is set to a smaller value for the absorption volume. Under these circumstances, the vehicle moment or engine moment to be set is computed at:

$$M_{FZ\_gefordert} = M_{Motor} = \frac{\left(P_{SpHigh} - P_{SpLow} + \frac{M_{Diesel} 2\pi}{V_p} \eta_{hm,P}\right) \cdot V_M}{2\pi} \eta_{hm,M} \quad (1)$$

where $M_{FZ\_gefordert}$ is the one for driving or accelerating the vehicle to a target vehicle speed. $P_{SpHigh}$ or $P_{SpLow}$ is the pressure in the first reservoir 40 or second reservoir 41 respectively. These pressures are detected, the manner already described, by the two pressure sensors 111 and 112 and a corresponding electrical signal, for example a voltage, is fed to the electronic control appliance 94. $V_P$ and $V_M$ are the delivery volume of the hydraulic pump 3 and the absorption volume of the hydraulic engine 7 respectively. The delivery volume $V_P$ and the absorption volume $V_M$ are in direct correlation with a swash-plate angle, if the hydrostatic piston machines of the hydraulic pump 3 and hydraulic engine 7 are axial piston machines of the swash-plate type. $M_{diesel}$ is the torque fed in at the drive shaft 4 of the hydraulic pump 3. In order to actually reach the torque last requested, which is required for driving the vehicle, it is also still necessary to take into account the hydromechanical efficiency of the pump $\eta_{hm,P}$ or of the hydraulic engine 7 $\eta_{hm,M}$.

As has already been explained, it is necessary to prevent the diesel internal combustion engine of the driving engine 2 from passing over into overrunning-type operation. For this purpose, the starting point adopted first of all will be that said diesel internal combustion engine does not emit any torque to the hydraulic pump 3 via the drive shaft 4. The maximum angle of swing of the hydraulic engine 7 is thereby calculated from the correlation:

$$V_M < \frac{2\pi M_{FZ\_gefordert}}{(P_{SpHigh} - P_{SpLow}) \eta_{hm,M}} \quad (2)$$

A larger absorption volume $V_n$ of the hydraulic engine 7 would, even because of the reservoir pressure, generated a working moment which exceeds the moment requested, and the hydraulic engine would consequently be supported against the driving engine 2.

In order to now ensure that the diesel internal combustion engine does not actually pass over into overrunning-type operation, the angle of swing of the hydraulic engine 7 is therefore selected so as to be slightly smaller. As a consequence of this, the diesel engine is subjected to load and generates a torque for driving the hydraulic pump 3.

The correlations indicated above can be used directly for ascertaining the second adjusting device 12 of the hydraulic engine 7, if the driving moment requested for the vehicle is directly specified via a user.

If on the other hand, as is often the case, only a target vehicle speed is specified by the user via the driving throttle 95, a mathematical estimate of a pre-control value for a requested hydraulic engine moment is first of all carried out. A target vehicle speed $v_{soll}$ and an actual vehicle speed $v_{ist}$ is ascertained for the purpose of ascertaining the pre-control value. The actual vehicle speed $v_{ist}$ is ascertained, for example from the speedometer signal, and is fed to the electronic control appliance 94 in a manner which is not represented. The target vehicle speed $v_{soll}$ is ascertained from the position of the driving throttle 95, which transmits a signal corresponding to its position to the electronic control appliance 94 via the first signal line 97. The pre-control value is produced in accordance with the correlation:

$$M_{schätz} = (v_{soll} - v_{ist}) k_1(m) + k_0, \quad (3)$$

where $M_{schätz}$ is the pre-control value. The constant $k_1(m)$ is a value which is established in dependence upon the mass of the vehicle. Just like the constant $k_0$, the constant $k_1(m)$ is either established empirically or calculated, and serves to establish the vehicle's acceleration behaviour.

In addition to this pre-control value $M_{schätz}$, a superimposed regulating system is used. In a first preferred form, this regulating system takes into account a minimum pressure addition via the hydraulic pump 3. For this purpose, a pressure value in the first working line 5 and second working line 6 in each case is measured by the first pressure sensor 105 and second pressure sensor 106 respectively. It is possible, from the pressure difference calculated between these two pressure sensors 111, 112, to monitor a minimum pressure increase which is carried out by the hydraulic pump 3. In the process, a boundary value for this minimum pressure increase is established. Said pressure increase is brought about by the diesel machine as a result of the torque fed to the hydraulic pump 3. It is thereby possible to ensure, by monitoring the pressure ratios at the pressure sensor 105 and 106, that the diesel internal combustion engine is loaded with a load and does not pass over into overrunning-type operation.

An alternative possibility for ensuring that the diesel internal combustion engine does not pass over into overrunning-type operation is to detect the diesel compression. For this purpose, a rotational-speed value is measured by the rotational-speed sensor 109 on the drive shaft 4, and fed to the electronic control appliance 94. If it is established, either on measuring the pressures in the first working line 5 and second working line 6 or by monitoring the rotational speed of the drive shaft 4, that the necessary diesel compression or necessary minimum pressure addition is not reached at an absorption volume $V_M$ which corresponds to the pre-control value $M_{schätz}$, the adjusting device 12 of the hydraulic engine 7 is activated in such a way that said hydraulic engine 7 is adjusted in the direction of smaller angles of swing. The load on the diesel internal combustion engine is thereby increased. The adjusting devices 11 and 12 are therefore activated by the electronic control signal 94.

As an alternative to this, the pre-control value $M_{schätz}$ can be increased.

If a moment for the diesel engine is directly specified, mathematical addition of the moments is also possible. The torque to be made available by the hydraulic engine 7 at any given time is equal to the sum of the torque generated at the hydraulic engine 7 by the reservoir pressure $p_{sp}$ in the first reservoir 40, and the torque added by the diesel internal combustion engine.

If the angle of swing for the hydraulic engine 7 is established from the requested torque, the necessary transmission ratio of the entire hydrostatic transmission can be ascertained from the vehicle speed $v_{ist}$. The angle of swing for the hydraulic pump 3 is then ascertained from this transmission ratio. A corresponding signal for activating the first adjusting device 11 is generated by the electronic control appliance 94 and fed to said first adjusting device 11.

In order to therefore make possible, at the transition between the regions II and III, travel with the recuperation of energy from the first reservoir 40 and travel in which the driving output is applied solely by the driving engine, the angle of swing of the engine or the absorption volume VM of the hydraulic engine 7 must also not drop below a minimum value. This ensures that a discontinuity in the angle of swing does not occur between regenerative acceleration and normal traction-type operation. The said discontinuity could arise, since computation of the angle of swing during the recuperation of the energy takes place in the manner described above.

As a departure from this, other computations of the angle of swing may occur for normal traction-type operation.

In the takeover point between regions II and III, these two values must be identical. A minimum angle of swing is therefore ascertained in accordance with the following correlation:

$$V_{M\_min\_rel} = \frac{k_{p1} - (P_{spHigh} - P_{spLow})}{k_{p1} - k_{p2}} \quad (4)$$

In the latter, $k_{p1}$ is the maximum possible differential pressure between the pressures in the first reservoir 40 and in the second reservoir 41. On the other hand, $k_{p2}$ is the minimum possible difference between the two reservoir pressures. The minimum reservoir-pressure difference is established by the switching criterion, for example the reaching of the minimum reservoir pressure $p_{min}$, at which there is a changeover from the regenerative accelerating operation to normal traction-type operation.

The condition indicated above leads to the fact that, at the switching point, that is to say that minimum differential pressure between the first reservoir 40 and the second reservoir 41 which is possible at the end of a regenerative acceleration, the relative minimum absorption volume of the engine $v_{M\_min\_re}$ becomes one. Said relative minimum absorption volume of the engine $V_{M\_min\_rel}$ indicates the ratio to the maximum possible absorption volume $V_M$ of the hydraulic engine 7. The minimum relative absorption volume of the engine thereby becomes equal to 1 at the minimum differential pressure between the first reservoir and the second reservoir, when there is a switchover from the regenerative accelerating operation to normal traction-type operation. By means of the correlation indicated above, it is ensured that, although a relatively small angle of swing of the engine can be set when large reserves of energy are still available in the first pressure reservoir, as said first reservoir 40 increasingly empties, the minimum angle of swing nevertheless comes closer and closer to that angle of swing of the engine which is necessary in normal traction-type operation, and is finally equal in size to the absorption volume computed for normal traction-type operation. If, therefore, the first reservoir 40 is emptied as far as a minimum pressure $p_{min}$ by the regenerative acceleration, there is a changeover to a normal hydrostatic traction-type operation. This corresponds, in FIG. 4, to the transition between regions II and III.

The rise in the absorption volume of the engine $V_M$ in section II is represented in the bottommost diagram in FIG. 4, and shows the increase in said absorption volume of the engine as the pressure in the first reservoir 40 declines.

In order to achieve an acceleration, the volume of the hydraulic pump 3 is adjusted up to its maximum delivery volume within the same space of time over the section II.

The computation of the absorption volume $V_M$ of the hydraulic engine 7 and the delivery volume $V_P$ of the hydraulic pump 3 takes place during a normal traction-type operation (section III) in dependence upon the target vehicle speed $v_{soll}$ and the ideal transmission necessary for the latter. In order to avoid an interruption in tractive power when there is a changeover between the two states of travel, the fourth seat valve 45 is first of all closed. This prevents unintentional filling of the first reservoir 40, which has a low pressure level at this point in time. After, therefore, said first reservoir 40 is cut off from the suction side of the hydraulic pump 3, the downstream working connection 9 of the hydraulic engine 7 is then connected to the second working line 6. For this purpose, the second seat valve 16 is opened by retraction of the signal fed, via the second control-signal line 100, to the electromagnet of the second pilot valve 36'. What is achieved as a: result of the switching sequence is that a pressure rise on the downstream side of the hydraulic engine 7, that is to say the side on which the low pressure prevails, is prevented. Since at the point in time at which the second seat valve 16 is opened, the fourth seat valve 45 was: already closed, the higher pressure in the first reservoir 40 has also already been broken down. Furthermore, a connection from the downstream side of the hydraulic engine 7 to the second reservoir 41 still exists at the point in time at which the second seat valve 16 is opened. The second reservoir 41, which is designed as a low-pressure reservoir, is therefore still able to contribute to the damping of the system. Finally, the sixth seat valve 58 is closed. In section III, therefore, further acceleration is possible by means of a normal hydrostatic traction-type drive in the closed circuit. The first seat valve 15 and second seat valve 16 are in the open position. The remaining seat valves 44, 45, 57 and 58 are now closed, and the hydraulic engine 7 is connected to the hydraulic pump 3 in a closed hydraulic circuit via the first working line 5 and second working line 6. There is preferably a second time interval between the closing of the fourth seat valve 45 and the opening of the second seat valve 16. Said second time interval likewise takes into account the valve dynamics.

The transition to reservoir braking, that is to say, to the charging-up of the first reservoir 40 during hydrostatic braking of the vehicle (section III), is initiated by actuation of the braking apparatus. In the present case, said braking apparatus is embodied as a brake pedal 96. Arranged on the brake pedal 96 is a sensor which passes on a signal, which is dependent upon the position of said brake pedal 96, to the electronic control unit 94 via a second signal line 98.

If an actuation of the brake pedal 96 is detected by said electronic control unit 94, the angle of swing, both of the hydraulic pump 3 and of the hydraulic engine 7, is first of all retracted. By this means, the delivery volume $V_p$ of the hydraulic pump 3 and the absorption volume $V_M$ of the hydraulic engine 7 are reduced in the same ratio. The transmission ratio of the hydrostatic transmission comprising the hydraulic pump 3 and the hydraulic engine 7 remains constant in the process. Reducing the angle of swing of the hydraulic pump 3 and hydraulic engine 7 lowers the tendency to jerkiness during the transition to reservoir braking.

The delivery volume of the hydraulic pump 3 and the absorption volume of the hydraulic engine 7 are reduced until said hydraulic pump 3 has reached a minimum delivery volume. This minimum delivery volume is different from zero and makes it possible to operate subsidiary consuming devices, even during reservoir braking.

In order to obtain a braking action, it is then necessary to set the hydraulic engine 7 to a larger absorption volume again. The setting of this larger absorption volume is dependent upon the requested braking action to be obtained. For this purpose, the hydraulic engine 7 is set to an absorption volume $v_M$ which is ascertained in dependence upon a brake-pedal position set by an operator.

Since the counter-pressure, against which the hydraulic engine 7, which is now working as a pump, delivers pressure medium to the first reservoir 40 during reservoir braking, rises as the degree of fullness of said first reservoir 40 increases, that absorption volume $v_M$ of the hydraulic engine 7 which is to be set must also take into account, in addition to the brake-pedal position, the current degree of fullness of said first reservoir 40. As the pressure difference between the first reservoir 40 and the second reservoir 41 increases, the absorption volume of the engine is therefore diminished. Moreover, it is advantageous to take into account, in addition to the pressure difference between the first reservoir 40 and the second reservoir 41, a pressure drop resulting from the throttling losses in lines and fittings. These throttling losses are represented by a pressure-drop value $\Delta p\,(v_M, V_{ist})$ which, in turn, depends upon the actual speed of the vehicle and that absorption volume $v_M$ of the hydraulic engine 7 which has been set. The pressure-drop value is dependent upon the vehicle speed, since the vehicle speed $v_{ist}$ which is current at any given time enters into the rotational speed of the hydraulic engine 7 and thus retroacts upon the volume flow delivered. For a specific brake-pedal position, therefore, the absorption volume of the hydraulic engine 7 is expressed by the following correlation:

$$V_M = \frac{M_{soll} 2\pi}{(P_{spHigh} - P_{spLow}) + \Delta p(V_M v_{ist})} \quad (5)$$

During reservoir braking, in addition to the first reservoir 40 and second reservoir 41, the working lines 5, 6 are preferably also connected to the hydraulic engine 7. The pressure medium delivered by said hydraulic engine 7 via the second engine-connecting line 14 is therefore delivered, on the one hand, to the first reservoir 40. In the process, kinetic energy is converted into pressure energy which is stored in said first reservoir 40 and is available again for subsequent accelerating operations. In addition, part of the pressure medium delivered by the hydraulic engine 7 is delivered to the second working line 6 when braking in the forward direction occurs. This portion of the volume flow is therefore available for driving subsidiary units. Furthermore, the delivery of a partial volume flow via the hydraulic pump 3 makes it possible to utilise the supporting moment of the driving engine 2 when there is insufficient braking action because of the filling of the first reservoir 40 with pressure medium.

If the hydraulic engine 7 is braked to a standstill, which is synonymous with bringing the output shaft 10 to a standstill, it is necessary to take into account the fact that the first reservoir 40 and second reservoir 41 are connected to the hydraulic engine 7 during reservoir braking. As a result, the vehicle cannot be immobilised. For the purpose of stopping the vehicle, therefore, the hydraulic engine 7 must be disconnected from the reservoirs 40, 41. In order to prevent a sudden collapse of the volume flow, the absorption volume $v_M$ of the hydraulic engine 7 is first of all reduced, as the vehicle speed $v_{ist}$, that is to say the rotational speed of the output shaft 10, drops, before the cutting-off of the reservoir 40, 41. As a result of this, a lower braking action occurs because of the declining braking moment. If a speed value, which can be defined when the drive is designed, is achieved, the reservoirs 40, 41 are uncoupled from the hydraulic engine 7. For this purpose, the fourth seat valve 45 is closed. In corresponding manner, the fifth seat valve 57 is also closed. The hydraulic engine 7 therefore remains connected to the hydraulic pump 3 in a closed hydraulic circuit only via the first and second seat valves 15, 16. In order to immobilise the vehicle hydrostatically, the hydraulic pump 3 is set to a fading delivery volume. After the vehicle has been braked to a standstill by reducing the angle of swing of the pump to zero, the first and second seat valves 15, 16 are open. On the other hand, all the remaining seat valves are closed. When the vehicle is stationary, the pump is zero-swung and the hydraulic engine 7 is generally adjusted to maximum absorption volume.

For the purpose of integrating automotive travel in which the operator specifies an engine moment or desire to accelerate instead of a target vehicle speed $v_{soll}$, a superimposed moment-regulating system may be provided. Under these circumstances, the position of the driving throttle 95 specifies an ideal compression for the diesel engine. The rate of rise of the ideal-speed path is ascertained from this with the aid of a regulator. The target vehicle speed $v_{soll}$ is ascertained on the basis of the regulating difference. If said target vehicle speed $v_{soll}$ is ascertained from said regulating difference, the pre-control value can be ascertained, in accordance with the method already described above, from the said target vehicle speed value $v_{soll}$ and the actual vehicle speed value $v_{ist}$. The subsequent determination of the absorption volume of the hydraulic engine, and also of the delivery volume of the hydraulic pump 3, takes place in the manner already described.

The above embodiments relate to a hydrostatic drive in which the first and second pilot valves lead, when in their inoperative position, to opening of the first and second seat valves 15, 16. In this starting position, the vehicle driven by the hydrostatic drive 1' is in its normal hydrostatic traction-type operation (section III). The above embodiments are also based on a traction-type drive which permits reservoir braking for both forward and rearward travel. In the same way, it is possible to carry out regenerative acceleration, that is to say acceleration using the pressure energy stored in the first reservoir 40, both for forward travel and also for rearward travel. In order to avoid unnecessary repetition, another detailed description of the reservoir braking for recuperating the stored pressure energy with regard to the hydrostatic drive 1 in FIG. 1, and also to the hydrostatic drive 1", which is set up solely for the storage and recuperation of energy in the case of forward travel, will be dispensed with.

The invention is not limited to the exemplified embodiment represented. On the contrary, even individual features of the exemplified embodiments can be combined with one another.

The invention claimed is:

1. A method of controlling a hydrostatic drive comprising a hydraulic pump and a hydraulic engine, and a first and a second reservoir for storing and recuperating energy, said method comprising the following steps:
    storing pressure energy in the first reservoir;
    connecting the first reservoir to a suction side of the hydraulic pump for recuperating the pressure energy stored in said first reservoir;
    connecting a downstream working-line connection of the hydraulic engine to the second reservoir; and
    disconnecting the downstream working-line connection of the hydraulic engine from the suction side of the hydraulic pump
    wherein the step of disconnecting the downstream working-line connection of the hydraulic engine from the suction side of the hydraulic pump is performed, and the step of connecting the first reservoir to the suction side of the hydraulic pump is performed after a fixed time interval.

2. The method according to claim 1, wherein the hydraulic pump is consistently loaded with a driving torque during the recuperation of the pressure energy by a driving engine.

3. The method according to claim 1, wherein the hydraulic engine is set, during the recuperation of energy, to an absorption volume ($V_M$) which is ascertained on the basis of a calculated pre-control value ($M_{schätz}$) for a hydraulic-engine moment.

4. The method according to claim 3, wherein the pre-control value ($M_{schätz}$) is corrected, taking into account measured actual quantities comprising a pressure difference via at least one of the hydraulic pump and the diesel compression.

5. The method according to claim 3, wherein the pre-control value ($M_{schätz}$) is ascertained from a difference between a target vehicle speed ($v_{soll}$) and an actual vehicle speed ($v_{ist}$).

6. The method according to claim 1, wherein at the end of a recuperation of stored energy from the first reservoir, said first reservoir is separated from the suction side of the hydraulic pump and, after a fixed second time interval, the downstream working connection of the hydraulic engine is connected to the suction side before said downstream working connection of the hydraulic engine is separated from the second reservoir.

7. The method according to claim 6, wherein for storing pressure energy, the downstream working connection of the hydraulic engine is connected to the first reservoir, and the upstream working connection of said hydraulic engine is connected to the second reservoir.

8. The method according to claim 7, wherein the storage of pressure energy is initiated by the actuation of a braking apparatus and, when a braking apparatus is actuated, both the hydraulic engine and the hydraulic pump are tilted, with a constant transmission ratio, to a lower absorption volume ($V_M$) and lower delivery volume ($V_P$) respectively.

9. The method according to claim 6, wherein when the braking apparatus is actuated, a delivery side of the hydraulic pump and the second reservoir are connected to the upstream working-line connection; and when said braking apparatus is actuated, a suction side of the hydraulic pump and the first reservoir are connected to a downstream working connection of the hydraulic engine.

10. The method according to claim 9, wherein during a storage operation, the hydraulic pump is set to a delivery volume ($V_P$) which is different from zero.

11. The method according to claim 6, wherein the absorption volume ($V_M$) of the hydraulic engine is set, during the storage of energy in the first reservoir, to a value which is dependent upon a braking signal from the braking apparatus and an effective pressure-difference value.

12. The method according to claim 1, wherein when braking occurs before an output shaft of the hydraulic engine has reached a standstill, the downstream working connection of said hydraulic engine is disconnected from the first reservoir, and the upstream working-line connection of said hydraulic engine is disconnected from the second reservoir, and the delivery volume ($V_P$) of the hydraulic pump is adjusted to zero.

13. The method according to claim 1, wherein for starting an internal combustion engine connected to the hydraulic pump, the first reservoir is connected to the suction side of said hydraulic pump.

14. The method according to claim 1, wherein for storing pressure energy in the first reservoir, the hydraulic pump is driven by a driving engine and the delivery side of said hydraulic pump is connected to said first reservoir.

* * * * *